United States Patent
Hsu et al.

(10) Patent No.: US 11,082,110 B2
(45) Date of Patent: Aug. 3, 2021

(54) COMMUNICATION METHOD AND COMMUNICATION DEVICE

(71) Applicant: MEDIATEK INC., Hsin-Chu (TW)

(72) Inventors: Tsai-Yuan Hsu, Hsinchu (TW); Chen-Feng Liu, Hsinchu (TW); Yuan-Chin Wen, Hsinchu (TW); Shun-Yong Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/528,644

(22) Filed: Aug. 1, 2019

(65) Prior Publication Data

US 2020/0177260 A1    Jun. 4, 2020

Related U.S. Application Data

(60) Provisional application No. 62/774,334, filed on Dec. 3, 2018.

(51) Int. Cl.
| | | |
|---|---|---|
| *H04B 7/02* | (2018.01) | |
| *H04B 7/06* | (2006.01) | |
| *H04W 8/22* | (2009.01) | |
| *H04B 7/0404* | (2017.01) | |
| *H04B 7/0456* | (2017.01) | |

(52) U.S. Cl.
CPC ......... *H04B 7/0628* (2013.01); *H04B 7/0404* (2013.01); *H04B 7/0469* (2013.01); *H04W 8/22* (2013.01)

(58) Field of Classification Search
CPC .. H04B 7/0628; H04B 7/0469; H04B 7/0404; H04W 8/22

USPC ......................................... 375/262, 267, 298
See application file for complete search history.

(56) References Cited

U.S. PATENT DOCUMENTS

| | | | | |
|---|---|---|---|---|
| 2007/0178839 | A1* | 8/2007 | Rezvani | H04B 7/0874 455/62 |
| 2009/0012360 | A1* | 1/2009 | Kimoto | A61B 1/00016 600/118 |
| 2009/0167311 | A1* | 7/2009 | Tong | H01Q 3/2605 324/378 |
| 2009/0232100 | A1* | 9/2009 | Faber | H04B 7/0817 370/334 |
| 2010/0029215 | A1* | 2/2010 | Honkanen | H04B 1/1027 455/63.3 |
| 2011/0249760 | A1* | 10/2011 | Chrisikos | H01Q 1/243 375/259 |
| 2011/0250926 | A1* | 10/2011 | Wietfeldt | H01Q 9/14 455/525 |
| 2014/0080468 | A1* | 3/2014 | Zhang | H04W 24/02 455/418 |

(Continued)

FOREIGN PATENT DOCUMENTS

CN    102668408 B    5/2016

*Primary Examiner* — Don V Vo
(74) *Attorney, Agent, or Firm* — Winston Hsu

(57) ABSTRACT

A communication method applied to an communication device comprising M first type antenna following a first communication standard and N second type antennas following a second communication standard, M and N are positive integers. The communication method comprises: (a) measuring usage time of the second type antennas; and (b) controlling a number of the antennas that the communication device use according to the usage time of the second type antennas.

22 Claims, 4 Drawing Sheets

(56) References Cited

U.S. PATENT DOCUMENTS

2014/0179252 A1* 6/2014 Takagi ................ H04B 7/0805
455/226.2
2016/0156392 A1* 6/2016 Jung ................... H04W 72/048

\* cited by examiner

COMMUNICATION METHOD AND COMMUNICATION DEVICE

CROSS REFERENCE TO RELATED APPLICATIONS

This application claims the benefit of U.S. Provisional Application 62/774,334, filed on 2018 Dec. 3, the contents of which are incorporated herein by reference.

BACKGROUND

A conventional STA may share it's at least one antenna with another STA to optimize usage efficiencies of the antennas. In such operation, the STA needs to send capability notification to inform other electronic devices (e.g. AP or another STA) its capability changes. The capability can mean transmitting capability or receiving capability, and capability changes can be caused by, for example, the number of receive chains, the number of spatial streams, or supported rates.

However, if the number of the capability notifications is large, a number of the notification overheads increases and compatibility between different STAs may decrease, thus reduce the throughput of the antennas.

SUMMARY

One objective of the present invention is to provide a communication method that can reduce the numbers of capability notifications.

Another objective of the present invention is to provide a communication method that can reduce the numbers of capability notifications.

One embodiment of the present invention provides a communication method applied to an communication device comprising M first type antenna following a first communication standard and N second type antennas following a second communication standard, M and N are positive integers. The communication method comprises: (a) measuring usage time of the second type antennas; and (b) controlling a number of the antennas that the communication device use according to the usage time of the second type antennas.

Another embodiment of the present invention provides a communication device, comprising: M first type antenna, following a first communication standard; N second type antennas, following a second communication standard, wherein M and N are positive integers; a control circuit, configured to perform following steps: (a) measuring usage time of the second type antennas; and (b) controlling a number of the antennas that the communication device use according to the usage time of the second type antennas.

Based on above-mentioned embodiments, the communication uses fixed antennas and do not generate capability notification when usage time of the L second type antennas is high or low, thus the number of capability notifications can be reduced and conventional notification overhead issues and compatibility issues can be improved.

These and other objectives of the present invention will no doubt become obvious to those of ordinary skill in the art after reading the following detailed description of the preferred embodiment that is illustrated in the various figures and drawings.

DETAILED DESCRIPTION

In following embodiments, the present application provides a communication device comprising M first type antennas and N second type antennas. M and N are positive integers. Also, the first type antenna follows a first communication standard and the second type antenna follows a second communication standard. In one embodiment, the first communication standard is a wireless communication standard that can communicate with an access point such as WiFi, and the second communication standard is a mobile communication standard such as 3G, 4G, or 5G. However, the first type antenna and the second type antenna are not limited to follow different standards.

Figure 1:
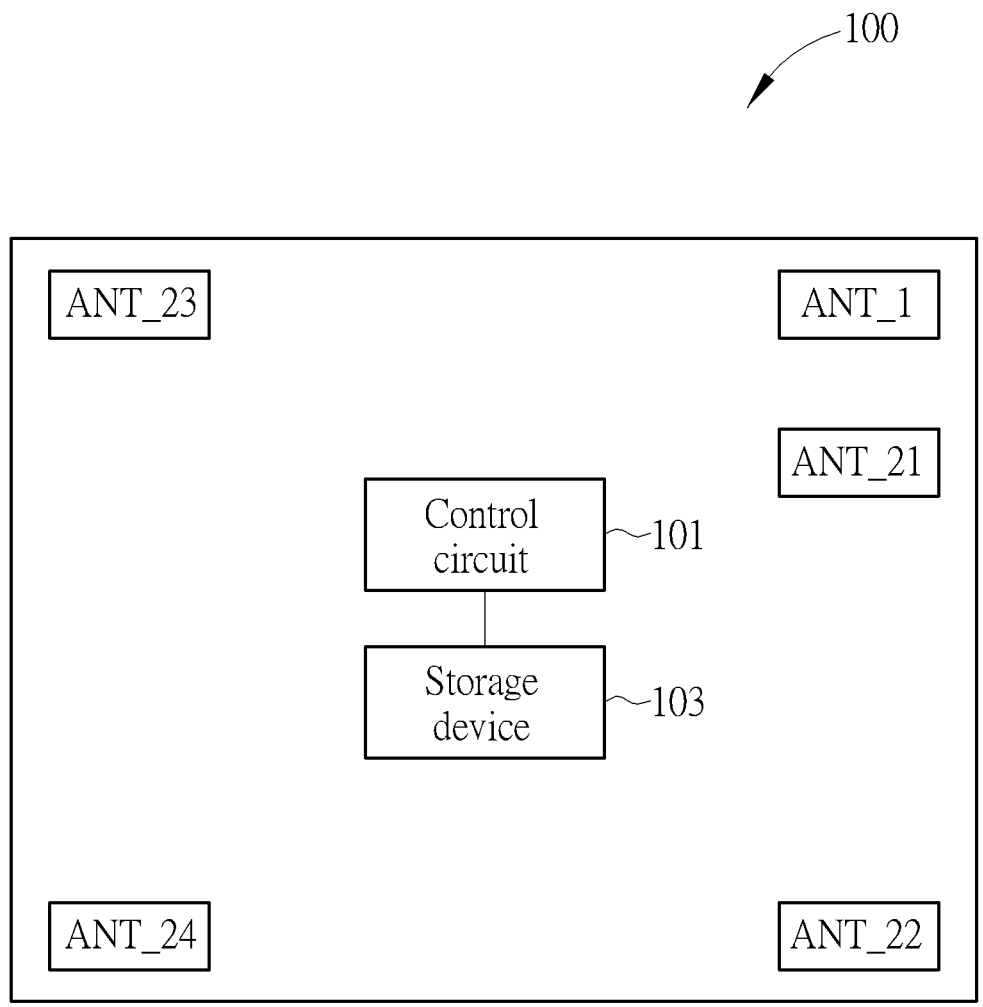
FIG. 1 is a block diagram illustrating a communication device according to one embodiment of the present invention.

FIG. 1 is a block diagram illustrating a communication device 100 according to one embodiment of the present invention. In this embodiment, the communication device 100 comprises one first type antenna ANT_1 (i.e. M=1) and four second type antennas ANT_21, ANT_22, ANT_23 and ANT_24 (i.e. N=4). Also, in the embodiment of FIG. 1, the first type antenna ANT_1 follows a WiFi standard, and the second type antennas ANT_21, ANT_22, ANT_23 and ANT_24 follow a mobile communication standard such as 3G, 4G, or 5G, but not limited. Additionally, in the embodiment of FIG. 1, the first type antenna ANT_1 is a dedicated antenna, which means it is only used by the communication device 100 and is not shared with any other communication device. Also, the second type antennas ANT_21, ANT_22, ANT_23 and ANT_24 are shared antennas which can be shared with another communication device. The "communication device" mentioned here and in following descriptions means an electronic device having communication ability. Such communication device can act as different roles in a communication network, for example, acts as an AP or a STA.

The communication device 100 further comprises a control circuit 101 and a storage device 103. The control circuit 101 can be a processor which can execute at least one program stored in the storage device 103 to perform following methods. Furthermore, the control circuit 101 can be any other circuit that can perform the same function. Besides, the storage device 103, such as a memory or a hard disk, can be provided outside the communication device 100 rather than provided in it.

In the embodiment of FIG. 1, the control circuit 101 collects the usage time of the second type antennas ANT_21, ANT_22, ANT_23 and ANT_24. Also, the control circuit 101 controls the communication device 100 to use a first predetermined number of antennas for communication, when a usage time for L of the second type antennas in a first predetermined time period is lower than a first usage time threshold, wherein L is a positive integer smaller or equal to N. As above-mentioned, N is 4 in the embodiment of FIG. 1, thus L can be 1, 2, 3 or 4 in the embodiment of FIG. 1. For example, if the usage time of the second type antennas ANT_21 and the usage time of the second type antenna ANT_22 in a first predetermined time period are lower than a first usage time threshold, the control circuit 101 controls the communication device 100 to use a first predetermined number of antennas for communication.

In one embodiment, the first predetermined number of antennas are all of the first type antennas and the L second type antennas. That is, the first predetermined number of antennas are M first type antennas and L second type antennas, thus the first predetermined number is M+L. For example, the first predetermined number of antennas comprises the first type antenna ANT_1 (i.e. M=1), the second type antennas ANT_21, ANT_22 and ANT_23 (L=3) in the embodiment of FIG. 1. Furthermore, in one embodiment, the usage time for the L second type antennas means a sharing time in which the communication device 100 shares the L second type antennas with at least one another communication device.

Briefly, in the above-mentioned embodiment, the communication device 100 uses the dedicated first type antenna ANT_1 and at least one of the second type antennas ANT_21, ANT_22, ANT_23 and ANT_24 for communication when the second type antennas ANT_21, ANT_22, ANT_23 and ANT_24 are not frequently used.

In another embodiment, the control circuit 101 controls the communication device 100 to use a second predetermined number of antennas for communication, when a usage time for L of the second type antennas in a second predetermined time period is higher than a second usage time threshold. The second predetermined number is smaller than the first predetermined number. In one embodiment, the first predetermined number of antennas are all of the first type antennas and the L second type antennas, and the second predetermined number of antennas comprises are all of the first type antennas. That is, the first predetermined number is M+L and the second predetermined number is M. For example, in the embodiment of FIG. 1, a usage time for all of the second type antennas AN_21, AN_22, AN_23 and AN_24 in a second predetermined time period is higher than a second usage time threshold, thus the communication device 100 uses the first type antenna AM_1 for communication. In one embodiment, the usage time for all of the second type antennas ANT_21, ANT_22, ANT_23 and ANT_24 means a sharing time in which the communication device 100 shares all of the second type antennas ANT_21, ANT_22, ANT_23 and ANT_24 with at least one another communication device.

Briefly, in the above-mentioned embodiment, the communication device 100 uses the dedicated first type antenna ANT_1 and does not use any of the second type antennas ANT_21, ANT_22, ANT_23 and ANT_24 for communication when the second type antennas ANT_21, ANT_22, ANT_23 and ANT_24 are frequently used.

In view of above-mentioned methods, the communication device 100 can use a fixed number of antennas while the second type antennas are frequently used or less frequently used. By this way, the number of capability notifications can be reduced.

Figure 2:
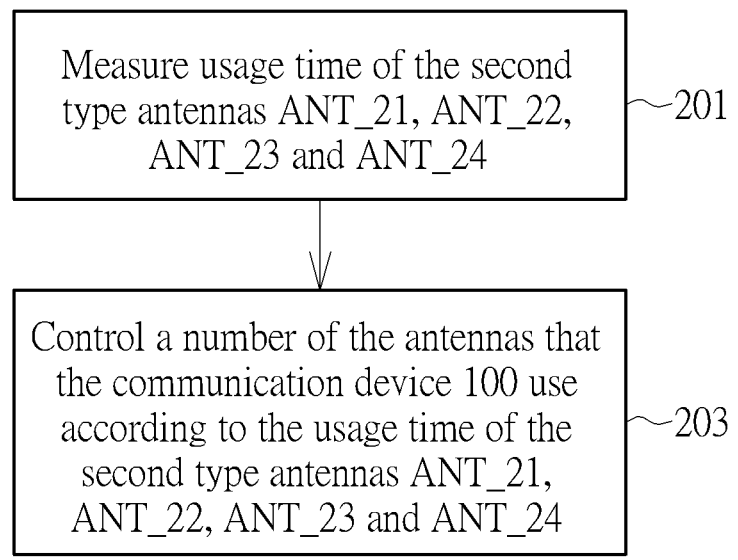
FIG. 2 is a flow chart illustrating a communication method according to one embodiment of the present application.
Figure 3:
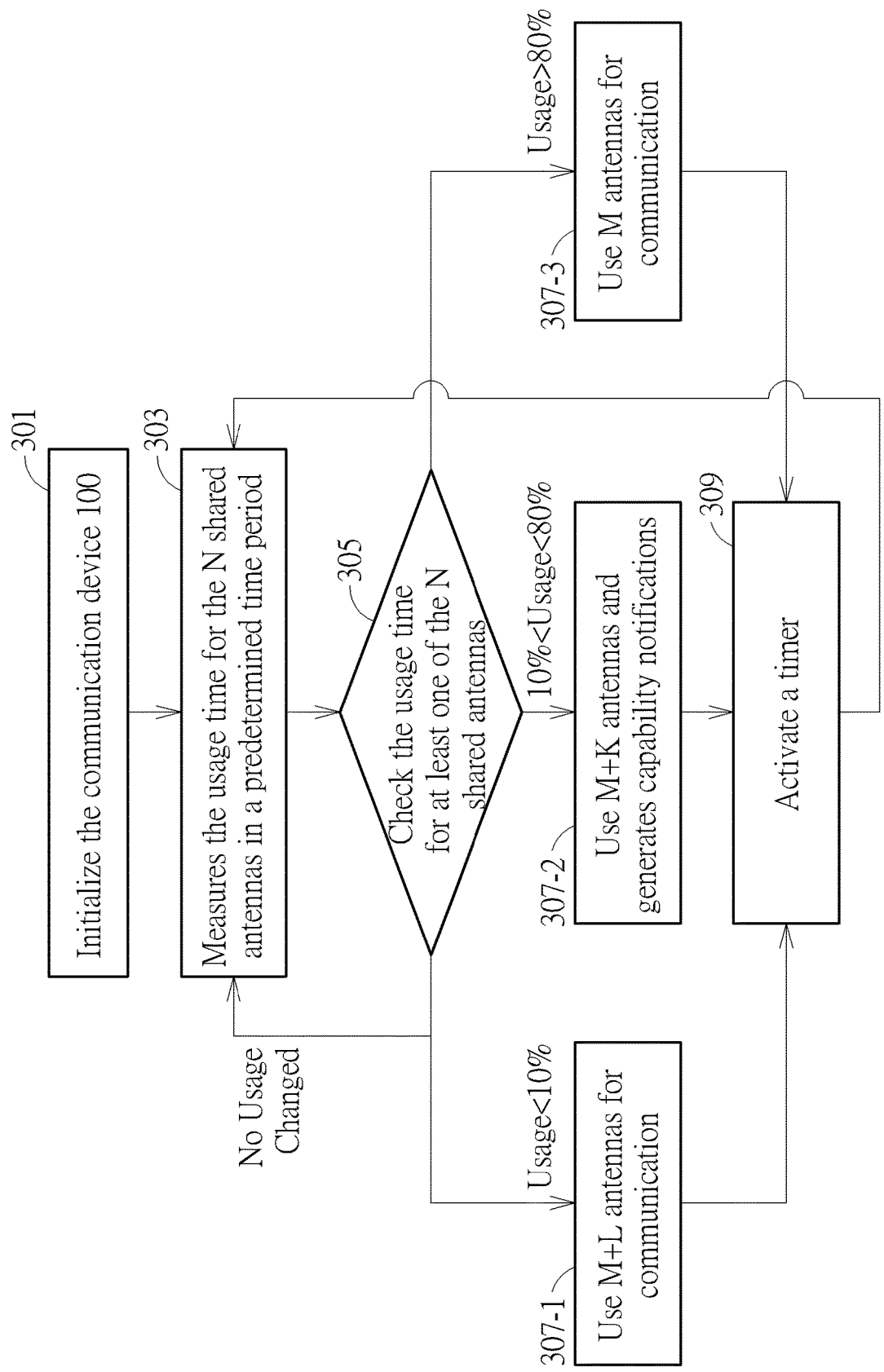
FIG. 3 is a more detail flow chart illustrating a communication method according to one embodiment of the present application.

FIG. 2 and FIG. 3 are flow charts illustrating communication methods according to different embodiments of the present invention. Please note, the steps in FIG. 2 and FIG. 3 are only for examples and do not mean to limit the scope of the present application.

FIG. 2 is a flow chart illustrating a communication method according to one embodiment of the present application. Please note, the communication method illustrated in FIG. 2 also takes the embodiment of FIG. 1 for example. The communication method in FIG. 2 comprises:

Step 201

Measure usage time of the second type antennas ANT_21, ANT_22, ANT_23 and ANT_24.

Step 203

Control a number of the antennas that the communication device 100 use according to the usage time of the second type antennas ANT_21, ANT_22, ANT_23 and ANT_24.

FIG. 3 is a more detail flow chart illustrating a communication method according to one embodiment of the present application. The communication method in FIG. 3 comprises:

Step 301

Initialize the communication device 100. In one example, the communication device 100 initially uses M+L antennas for communication, and the communication device 100 has M dedicated antennas and N shared antennas. For example, in FIG. 1 the communication device 100 has one dedicated first type antenna ANT_1 and 4 shared second type antennas ANT_21, ANT_22, ANT_23 and ANT_24, and the communication device 100 initially uses the first type antenna ANT_1, the second type antennas ANT_2, ANT_3 for communication.

Step 303

The control circuit 101 measures the usage time for the N shared antennas in a predetermined time period (e.g. 200 ms).

Step 305

Check the usage time for at least one of the N shared antennas and go to one of the steps 307_1, 307_2 and 307_3 based on the usage time. If the usage time is the same as the previous measured usage time, go back to the step 303.

Specifically, when the usage time for L of the second type antennas in a first predetermined time period is lower than a first usage time threshold (10% in this example), the flow goes to the step 307_1. The 10% means a percentage for the usage time comparing with the first predetermined time period. For example, if the first predetermined time period is 3 second, and the usage time of the second type antennas ANT 2_1, ANT 2_2 (L=2 in this case) is 0.3 seconds, the percentage is 10%.

Also, when the usage time for K of the second type antennas ANT_1, ANT_2, ANT_3 and ANT_4 in a first predetermined time period is higher than a first usage time threshold, the flow goes to the step 307_2. K is a positive integer lower than the positive integer L.

Additionally, when the usage time for L of the second type antennas ANT_1, ANT_2, ANT_3 and ANT_4 in a second predetermined time period is higher than a second usage time threshold (80% in this example), the flow goes to the step 307_3. The second predetermined number is smaller than the first predetermined number.

Please note, in above-mentioned examples, the first usage time threshold and the second usage time threshold are ratios. However, the first usage time threshold and the second usage time threshold can be specific values such as 100 ms second.

Step 307_1

The communication device 100 uses a first predetermined number of antennas for communication. As above-mentioned, the first predetermined number can be M+L. In the embodiment of FIG. 1, the first predetermined number of antennas mean the first type antenna ANT_1 and at least one of the second type antennas ANT_21, ANT_22, ANT_23 and ANT_24. Accordingly, in the step 307_1, M is 1 and L is 1, 2, 3 or 4.

Step 307_2

The communication device 100 uses M+K antennas and generates capability notifications to update such capability change to another communication device.

Step 307_3

The communication device 100 uses a second predetermined number of antennas for communication. As above-mentioned, the second predetermined number can be M. In the embodiment of FIG. 1, the second predetermined number of antenna means the first type antenna ANT_1, thus M is 1.

Step 309

After the step 307_1, the step 307_2 or the step 3073, a timer is activated. After the time that the timer counts reaches a predetermined time period (e.g. 500 ms), the flow goes back to the step 303. By this way, the usage time of the second type antennas can be periodically measure, to ensure the using of the first type antennas and the second type antennas can be optimized.

Figure 4:
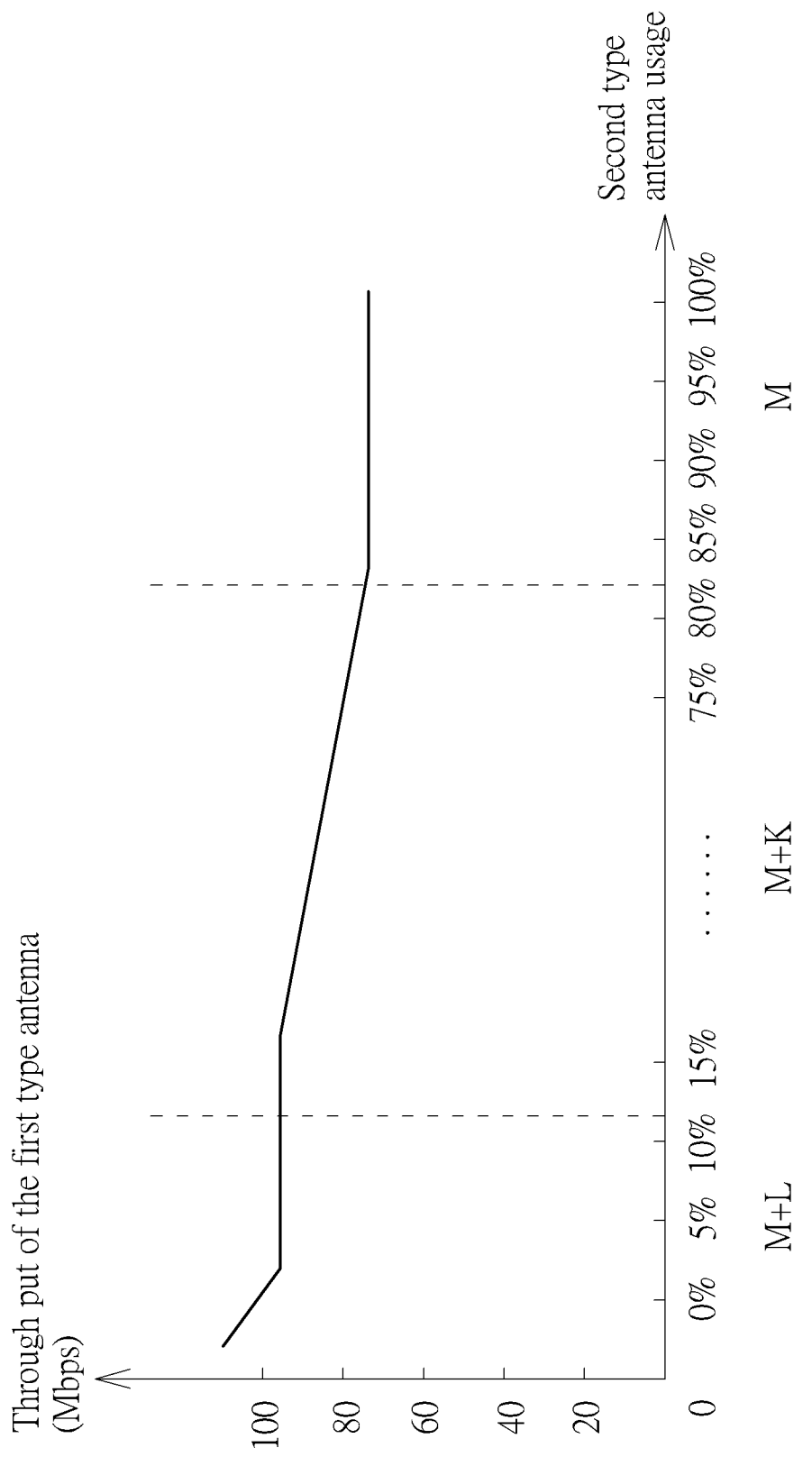
FIG. 4 is a schematic diagram illustrating the communication method according to one embodiment of the present application.

FIG. 4 is a schematic illustrating the communication method according to one embodiment of the present application. As illustrated in FIG. 4, if usage time of L second type antennas is lower than a first usage time threshold (e.g. lower than 12%), the communication device 100 uses M+L antennas comprising M first type antennas and L second type antennas. On the opposite, if the usage time of L second type antennas is higher than a second usage time threshold (e.g. higher than 85%) the communication device 100 uses M antennas. Additionally, if the usage time of L second type antennas is between the first usage time threshold and the second usage time threshold, the communication device 100 uses M+K antennas and generate capacity notification to inform such information to another communication device.

In a conventional communication method, the throughput of the first type antenna great decreases if the usage time of the second type antennas are high, since the communication device still sends capability notifications when the usage time of the second type antennas are high is high and the number of the antennas which the communication device use do not frequently change.

Based on above-mentioned embodiments, the communication uses fixed antennas and do not generate capability notification when usage time of the L second type antennas is high or low, thus the number of capability notifications can be reduced and conventional notification overhead issues and compatibility issues can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method applied to a communication device comprising M first type antenna following a first communication standard and N second type antennas following a second communication standard and being shared antennas which can be shared with another communications device, M and N are positive integers, the communication method comprising:
   (a) measuring usage time of the second type antennas comprising an amount of time the second type antennas are used within a first predetermined time period compared to a total amount of time in the first predetermined time period; and
   (b) controlling a number of the antennas that the communication device use according to the usage time of the second type antennas.

2. The communication method of claim 1, wherein the first type antennas are dedicated antennas, wherein the steps (b) controls the communication device to use M of the first type antennas, or use M of the first type antennas and L of the second type antennas according to the usage time of the second type antennas, wherein L is a positive integer smaller or equal to N.

3. The communication method of claim 1, wherein the step (b) controls the communication device to use a first predetermined number of antennas for communication, when the usage time for L of the second type antennas in a first predetermined time period is lower than a first usage time threshold, wherein L is a positive integer smaller or equal to N.

4. The communication method of claim 3, wherein the first predetermined number of antennas comprise all of the first type antennas and the L second type antennas.

5. The communication method of claim 3, wherein the usage time for the L second type antennas means a sharing time in which the communication device shares the L second type antennas with at least one another communication device.

6. The communication method of claim 3, wherein the first usage time threshold is a percentage of the usage time within the first predetermined time period compared with the total amount of time in the first predetermined time period.

7. The communication method of claim 1, wherein the step (b) controls the communication device to use a second predetermined number of antennas for communication, when a usage time for L of the second type antennas in a second predetermined time period is higher than a second usage time threshold, wherein L is a positive integer smaller or equal to N, wherein the second predetermined number is smaller than the first predetermined number.

8. The communication method of claim 7, wherein the first predetermined number of antennas comprise all of the first type antennas and the L second type antennas, and the second predetermined number of antennas comprise all of the first type antennas.

9. The communication method of claim 7, wherein the usage time for all of the second type antennas means a sharing time in which the communication device shares all of the second type antennas with at least one another communication device.

10. The communication method of claim 7, wherein the second usage time threshold is a percentage of the usage time within the second predetermined time period compared with a total amount of time in the second predetermined time period.

11. The communication method of claim 1, wherein the first communication standard is a wireless communication standard can communicate with an access point, and the second communication standard is a mobile communication standard.

12. A communication device, comprising:
   M first type antenna, following a first communication standard;
   N second type antennas, following a second communication standard, wherein M and N are positive integers;
   a control circuit, configured to perform following steps:
      (a) measuring usage time of the second type antennas comprising an amount of time the second type antennas are used within a first predetermined time period compared to a total amount of time in the first predetermined time period; and (b) controlling a number of the antennas that the communication device use according to the usage time of the second type antennas.

13. The communication device of claim 12, wherein the first type antennas are dedicated antennas and the second type antennas are shared antennas which can be shared with another communications device, wherein the steps (b) controls the communication device to use M of the first type antennas, or use M of the first type antennas and L of the second type antennas according to the usage time of the second type antennas, wherein L is a positive integer smaller or equal to N.

14. The communication device of claim 12, wherein the step (b) controls the communication device to use a first predetermined number of antennas for communication, when the usage time for L of the second type antennas in the first predetermined time period is lower than a first usage time threshold, wherein L is a positive integer smaller or equal to N.

15. The communication device of claim 14, wherein the first predetermined number of antennas comprise all of the first type antennas and the L second type antennas.

16. The communication device of claim 14, wherein the usage time for the L second type antennas means a sharing time in which the communication device shares the L second type antennas with at least one another communication device.

17. The communication device of claim 14, wherein the first usage time threshold is a percentage of the usage time within the first predetermined time period compared with the total amount of time in the first predetermined time period.

18. The communication device of claim 12, wherein the step (b) controls the communication device to use a second predetermined number of antennas for communication, when a usage time for L of the second type antennas in a second predetermined time period is higher than a second usage time threshold, wherein L is a positive integer smaller or equal to N, wherein the second predetermined number is smaller than the first predetermined number.

19. The communication device of claim 18, wherein the first predetermined number of antennas comprise all of the first type antennas and the L second type antennas, and the second predetermined number of antennas comprise all of the first type antennas.

20. The communication device of claim 18, wherein the usage time for all of the second type antennas means a sharing time in which the communication device shares all of the second type antennas with at least one another communication device.

21. The communication device of claim 18, wherein the second usage time threshold is a percentage of the usage time within the second predetermined time period compared with a total amount of time in the second predetermined time period.

22. The communication device of claim 12, wherein the first communication standard is a wireless communication standard can communicate with an access point, and the second communication standard is a mobile communication standard.

* * * * *